US008498288B2

(12) United States Patent
Rozinsky

(10) Patent No.: US 8,498,288 B2
(45) Date of Patent: Jul. 30, 2013

(54) SYSTEM AND METHOD FOR ACHIEVING VOICE-ACTIVATED RADIO BROADCASTING OVER IP NETWORKS

(75) Inventor: Saul D. Rozinsky, Blooming Grove, NY (US)

(73) Assignee: Barclays Capital, Inc., New York, NY (US)

( * ) Notice: Subject to any disclaimer, the term of this patent is extended or adjusted under 35 U.S.C. 154(b) by 1057 days.

(21) Appl. No.: 11/416,012

(22) Filed: May 1, 2006

(65) Prior Publication Data
US 2006/0256713 A1  Nov. 16, 2006

Related U.S. Application Data

(60) Provisional application No. 60/676,018, filed on Apr. 29, 2005.

(51) Int. Cl.
*H04L 12/56* (2006.01)
*H04J 1/16* (2006.01)

(52) U.S. Cl.
USPC ............................ 370/352; 370/315; 370/386

(58) Field of Classification Search
USPC .................................. 370/351, 315, 352, 386
See application file for complete search history.

(56) References Cited

U.S. PATENT DOCUMENTS

| | | | |
|---|---|---|---|
| 4,119,800 A | 10/1978 | Girardi | |
| 6,125,113 A | 9/2000 | Farris | |
| 2004/0012501 A1* | 1/2004 | Mazzara et al. | 340/870.11 |
| 2004/0067752 A1 | 4/2004 | Himmelstein | |
| 2005/0090238 A1* | 4/2005 | Lai et al. | 455/416 |
| 2005/0141471 A1* | 6/2005 | Virtanen et al. | 370/342 |
| 2005/0169451 A1* | 8/2005 | Huang et al. | 379/220.01 |
| 2005/0246166 A1* | 11/2005 | Creamer et al. | 704/208 |
| 2005/0250534 A1* | 11/2005 | Maurer | 455/556.1 |
| 2006/0019655 A1* | 1/2006 | Peacock | 455/426.1 |
| 2006/0045063 A1* | 3/2006 | Stanford et al. | 370/345 |
| 2009/0215411 A1* | 8/2009 | Tucker et al. | 455/90.2 |

FOREIGN PATENT DOCUMENTS

| | | |
|---|---|---|
| JP | 62-219794 | 9/1987 |
| WO | 00/64112 | 10/2000 |

OTHER PUBLICATIONS

Written Opinion of PCT/US2006/017173 dated Aug. 30, 2007, 4 pages.
International Search Report of PCT/US2006/017173 dated Aug. 30, 2007, 3 pages.
International Preliminary Report on Patentability of PCT/US2006/017173 dated Oct. 30, 2007, 5 pages.
Publication of PCT/US2006/017173 dated Nov. 9, 2006, 12 pages.
JP First Office Action dated Feb. 1, 2011 for Japanese Application No. 2008-509251, 4 pages.
Voice-Activated Relay VAR1 Manual, 2003, URL: http://www.bogen.com/products/pdfs/specialelectronicspdfs/VAR1m.pdf.
Cisco 1750 Product Brochure, 2000, URL: http://www.cisco.com/web/JP/product/hs/routers/c1700/c1750/prodlit/pdf/0130_c1750.pdf.

(Continued)

*Primary Examiner* — John Pezzlo
(74) *Attorney, Agent, or Firm* — Morgan Lewis & Bockius LLP

(57) ABSTRACT

A system and method for adding voice capability to an existing computer network having non-voice-ready routers is described. A radio broadcasting base station is connected to a voice activated relay, such that the relay activates or switches to a broadcast mode of the base station when a voice signal is received from the router.

10 Claims, 3 Drawing Sheets

OTHER PUBLICATIONS

PBS-122D Product Brochure, 2004, URL: http://web.archive.org/web/20040723141141/www.ritron.com/pbs-d.pdf.
Decision of Rejection dated Jun. 7, 2011 for Japanese Application No. 2008-509251, 4 pages.
European Patent Application No. 06752233.4., Extended European Search Report, dated May 8, 2013, 6 pages.
Japanese Patent Application No. 2008-509251, Official Inquiry, dated Mar. 6, 2012, 7 pages.

* cited by examiner

SYSTEM AND METHOD FOR ACHIEVING VOICE-ACTIVATED RADIO BROADCASTING OVER IP NETWORKS

CROSS-REFERENCE TO RELATED APPLICATIONS

This application claims the benefit of prior filed U.S. Provisional Application No 60/676,018, filed Apr. 29, 2005, which is incorporated herein by reference.

BACKGROUND OF THE INVENTION

This invention relates in general to communication network applications. Specifically, this invention is directed to a system and method for achieving voice-activated radio broadcasting in packet-switching communication networks.

FIG. 1 shows a typical network configuration for achieving radio broadcasting using IP networks. In such a configuration, incoming IP packets 110 from an IP network 100 are received by a router 120 with VoIP capabilities and an E&M (ear & mouth) interface card 130. Software running in Router 120 detects the voice packets contained in IP packets 110 and toggles the E&M interface card 130 to switch on/off the radio device 140 coupled to the E&M interface 130.

A drawback of this configuration is that many VoIP routers in use need to be upgraded to be able to run the software that toggles the E&M interface. Such upgrades can be very expensive. Moreover, the upgraded router must use a special radio device coupled to the E&M interface. Therefore, there is a need to achieve network radio broadcasting using an available radio broadcasting device without upgrading routers.

SUMMARY OF THE INVENTION

One aspect of the present invention comprises a system operable to provide radio broadcasting over a packet-switching communication network. This system comprises: a first system for receiving information from the packet-switching communication network and detecting a voice signal from the received information; a second system capable of being activated by the voice signal detected by the first system; and a third system for broadcasting the voice signal received from the activated second system, wherein the second system preferably is activated without using any software means.

Another aspect of the present invention comprises a method for achieving radio broadcasting over a packet-switching communication network. This method preferably comprises the steps of: receiving information from the packet-switching communication network; detecting a voice signal from the received information; activating a radio broadcasting system based on the detected voice signal; and broadcasting the voice signal through the broadcasting system, wherein the broadcasting system preferably is activated without using any software means.

BRIEF DESCRIPTION OF THE DRAWINGS

The invention will be described by reference to the preferred and alternative embodiments thereof in conjunction with the drawings in which.

DETAILED DESCRIPTION

Figure 1:
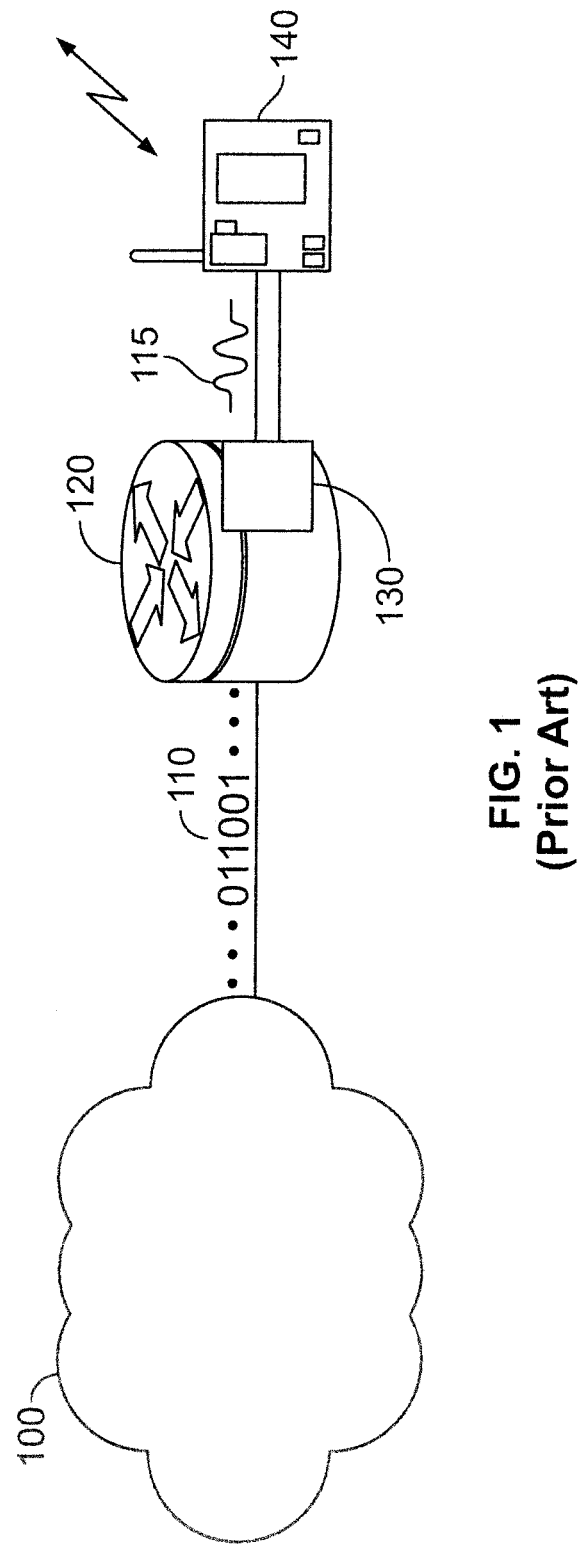
FIG. 1 depicts a typical network configuration for achieving radio broadcasting using IP networks.
Figure 2:
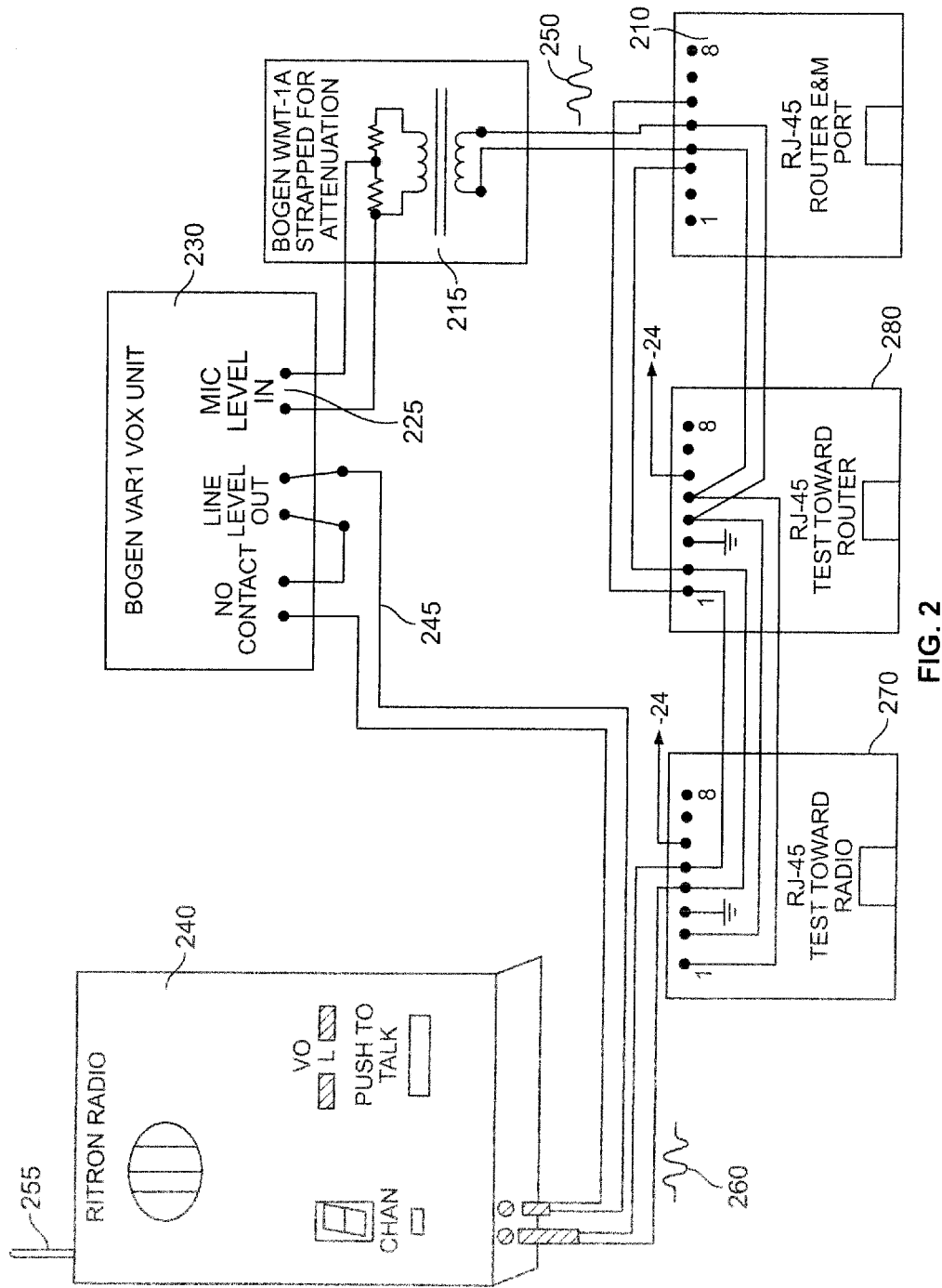
FIG. 2 depicts an embodiment of the invention.

FIG. 2 depicts an embodiment of the invention. This embodiment includes a router E&M port 210 that is connected to an E&M interface card residing in a router with VoIP capabilities. The router can be any device capable of receiving information from a packet-switching communication network, such as an IP network, and detecting voice data. A typical example of such a router is a Cisco 2600 series router. The router detects voice packets from the incoming IP packets, and sends the voice signal 250 through the E&M port 210 to the transformer/attenuator 215 that is coupled to the microphone input 225 of a VAR (voice-activated relay) unit 230. The VAR unit 230 serves as a relay that is activated when an audio signal is detected at its microphone input 225. When VAR 230 receives the audio signal 250, it automatically switches on its output circuit without using any software means and forwards the audio signal 250 to a radio broadcasting device 240 coupled to its output line 245. The output circuit of the VAR 230 activates a push-to-talk circuitry of the radio broadcasting device 240, causing the radio broadcasting device 240 to begin transmitting. The user of another suitable radio device (not shown) will then be able to listen to the audio signal 250 broadcast from broadcasting device 240. The VAR 230 may be any voice-activated device. A typical example of such device is a Bogen VAR1 voice-activated relay unit available from Bogen Communications, Inc. of Ramsey, N.J. The radio broadcasting base station 240 may be any two-way radio device. A typical example of such a device is a Ritron two-way portable radio available from Ritron, Inc. of Carmel, Ind. When there is no longer an audio signal 250 present, the VAR switches to its idle state, and the radio broadcasting device 240 stops transmitting. The radio broadcasting device 240 is now ready to receive radio signals from radio users nearby.

The radio broadcasting device 240 includes an antenna 255 that receives radio signals from radio users nearby. Audio signal 260 received through the antenna 255 is passed through the E&M port 210 to the router. This embodiment preferably also contains two RJ-45 ports 270 and 280. These two ports may be used for testing purposes to determine whether the radio 240 and the router are functioning correctly.

Figure 3:
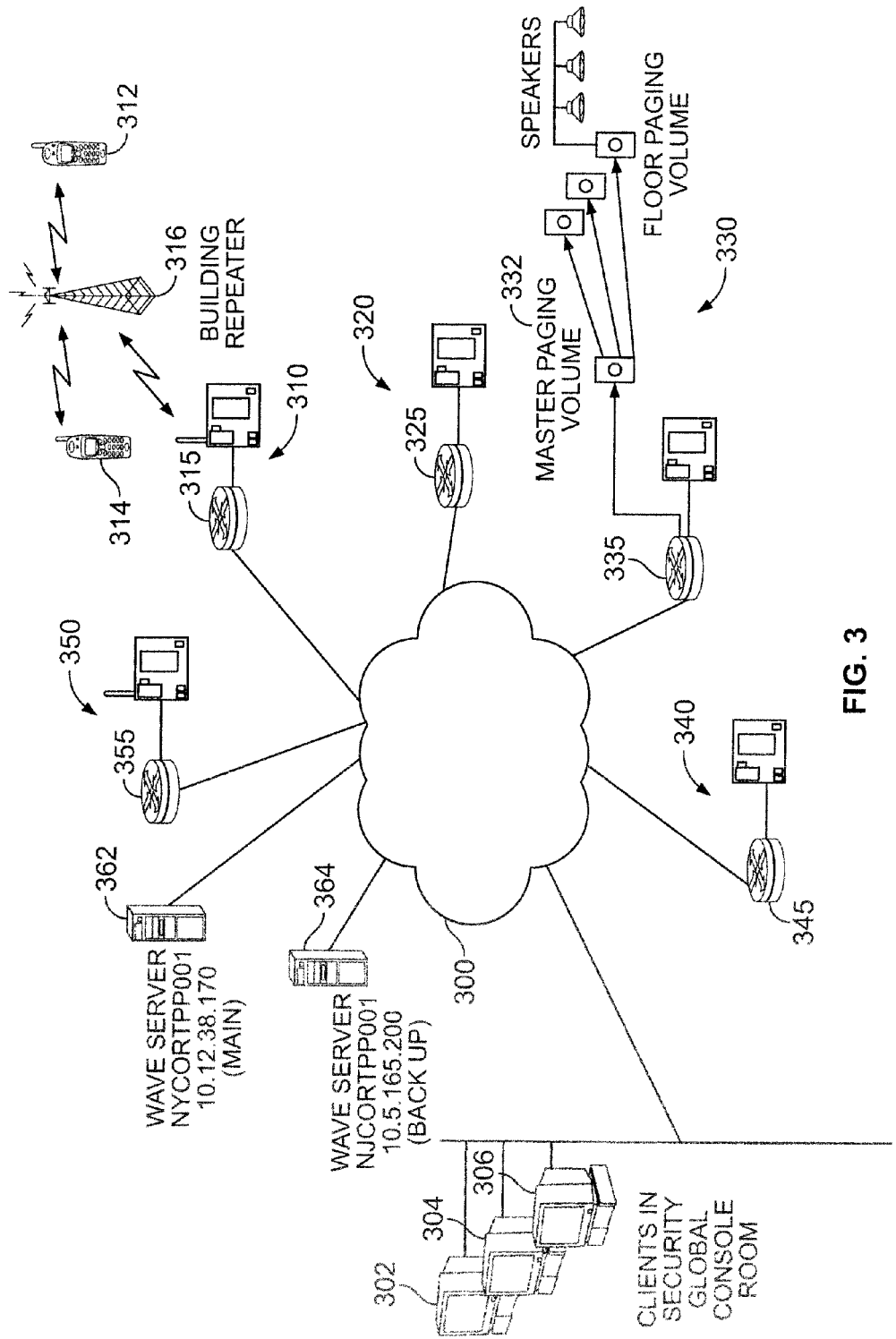
FIG. 3 depicts a configuration of a radio broadcasting network in one embodiment of the invention.

FIG. 3 depicts a configuration of a radio broadcasting network in one embodiment of the invention. This network comprises several groups of radio users 310-350. Each group may further include computers or radio users communicating with each other. For example, group 310 contains radio users 312 and 314 communicating through a radio repeater 316 residing in a building close by. Group 330 contains a paging system 332. All user groups 310-350 are connected via routers 315, 325, 335, 345, and 355 to a communication network 300. A user group may use a graphical user interface (GUI) software running in client computers 302-306 to request to talk to other user groups. The client computers 302-306 will send the request to servers 362 or 364. Software running in servers 362 and 364 will set up the network communication link among the selected user groups. This embodiment preferably uses the "Wave" software application provided by Twisted Pair Solutions, LLP of Seattle, Wash. to provide the GUI and to set up the communication link.

After the network communication link is established, voice packets from one group to another will be received by router 315, 325, 335, 345, or 355, transmitted to the VAR units coupled to the routers, and forwarded to the radio broadcasting devices or paging system contained in the user groups 310-350 as described above.

Embodiments of the present invention comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. A system comprising:
   a first system that receives information from a packet-switching communication network and detects a voice signal in the received information;
   a second system that is activated by the voice signal detected by the first system; and
   a third system that broadcasts the voice signal received from the activated second system,
   wherein the second system is activated without using any software,
   wherein the voice signal is received at a microphone input of the second system, the microphone input being connected to an ear-and-mouth port of the first system,
   wherein the second system is a component that stands alone from the first system, and
   wherein an output of the activated second system activates a transmission capability of the third system and transmits the voice signal.

2. A method comprising the steps of
   receiving information from a packet-switching communication network using a router;
   detecting a voice signal in the received information using the router;
   transmitting the voice signal to a voice-activated relay using the router, the voice-activated relay outputting the voice signal to a radio broadcasting system and activating the radio broadcasting system without using any software; and
   broadcasting the voice signal through the radio broadcasting system,
   wherein the voice-activated relay is a component that stands alone from the router.

3. A system comprising:
   a router configured to receive information from a packet-switching communication network, detect a voice signal in the received information and transmit the voice signal to a voice-activated relay;
   the voice-activated relay configured to receive the voice signal from the router and transmit the voice signal to a radio broadcasting base station, the voice-activated relay configured to activate the radio broadcasting base station without using any software; and
   the radio broadcasting base station configured to broadcast the voice signal from the voice-activated relay, the radio broadcasting base station normally in a receive state for receiving incoming signals,
   wherein the voice-activated relay is a component that stands alone from the router.

4. The system of claim 3 wherein the voice-activated relay is operable to activate push-to-talk circuitry in the radio broadcasting base station, thereby to switch the radio broadcasting base station to the broadcast state.

5. The system of claim 3 wherein the voice-activated relay is operable to switch the radio broadcasting base station from a broadcast state to the receive state when the voice signal is no longer present.

6. The system of claim 3 wherein the voice-activated relay is operable to switch to an idle state when the voice signal is no longer present.

7. The system of claim 6, wherein the base station is configured to stop transmitting when the voice-activated relay is in the idle state.

8. The system of claim 6, wherein the base station is operable to receive radio signals when the voice-activated relay is in the idle state.

9. The system of claim 3, wherein the router is further operable to receive an audio signal from the base station.

10. The system of claim 9, wherein the router is operable to receive the audio signal through an ear-and-mouth port of the router.

* * * * *

UNITED STATES PATENT AND TRADEMARK OFFICE
CERTIFICATE OF CORRECTION

| | | |
|---|---|---|
| PATENT NO. | : 8,498,288 B2 | Page 1 of 1 |
| APPLICATION NO. | : 11/416012 | |
| DATED | : July 30, 2013 | |
| INVENTOR(S) | : Rozinsky | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2082 days.

Signed and Sealed this
Third Day of March, 2015

Michelle K. Lee
*Deputy Director of the United States Patent and Trademark Office*